Peter Numsen  Impt. in
Closing Vessels hermetically
75189
PATENTED
MAR 3 1868
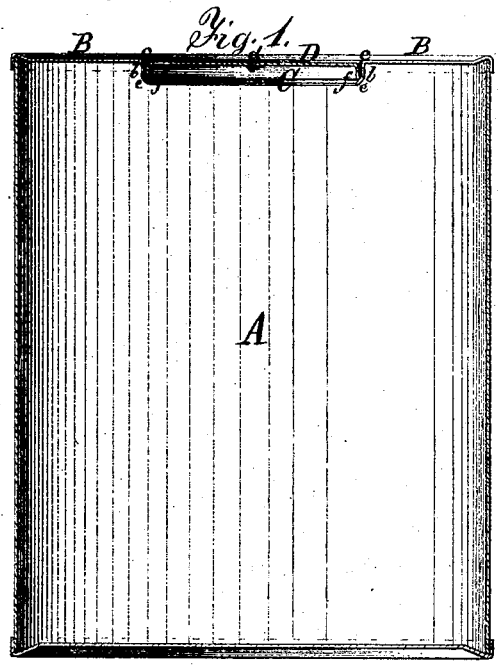
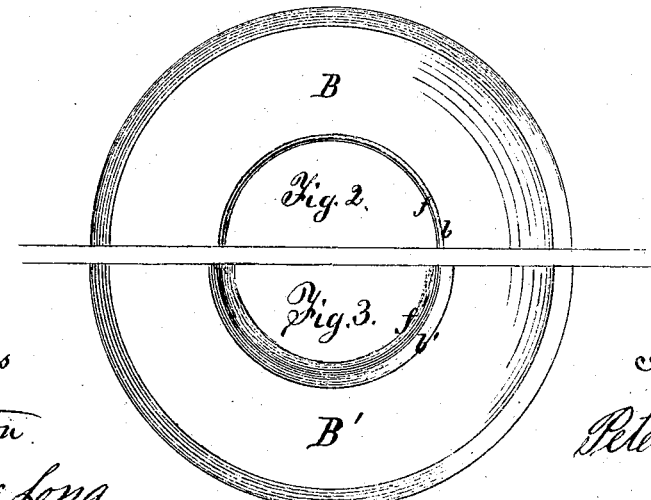
Witnesses
Jos. Peyton
Balt° De Long
Inventor
Peter Numsen
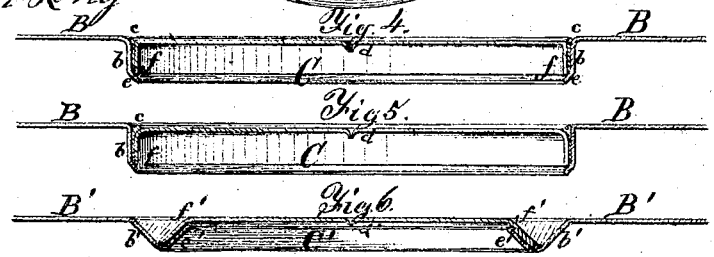

United States Patent Office.

PETER NUMSEN, OF BALTIMORE, MARYLAND.

Letters Patent No. 75,189, dated March 3, 1868.

---

IMPROVEMENT IN FRUIT-CANS.

The Schedule referred to in these Letters Patent and making part of the same.

---

TO ALL WHOM IT MAY CONCERN:

Be it known that I, PETER NUMSEN, of the city and county of Baltimore, and State of Maryland, have invented a new and improved Mode of Sealing or Shutting Tin or other Metal Vessels, or vessels partly made of metal, thereby saving a great amount of solder or other sealing-matter, and doing away with a good deal of labor connected with the operation of sealing or soldering up of said vessels; and I do hereby declare that the following is a full and exact description thereof, reference being had to the accompanying drawings, and to letters of reference marked thereon. In the drawings—

Figure 1 is a longitudinal section of a tin can used for putting up oysters or preserves.

Figure 2 is a half of a top view of it.

Figure 3 is a half of a top view of an old kind of tin cans, showing the difference between the old and my method of shaping the hole and closing-cap hereafter to be described.

Figures 4 and 5 show two enlarged sections of my cap and hole.

Figure 6 is an enlarged section of cap and hole of the construction now in use.

The nature of my invention consists in so constructing a hole and its closing-cap for a vessel, wholly or partly made of tin or other sheet metal, that the sealing-matter or solder forms a straight cylinder or ring of exceeding thinness, thereby making a very strong joint with the aid of very little material.

To effect this I punch a round hole in that part of the vessel intended for the purpose, which, by a certain operation, is enlarged to the proper size by turning down part of the surrounding metal in the form of a short tube, as shown in fig. 1, in section $b\ b$, and also in fig. 4 and fig. 5, $b\ b$. The end of this tubular rim is slightly turned in, so as to form an obtuse angle with the straight part $b\ b$, as shown by letters $e\ e$ in figs. 1, 4, 5. This rim serves to keep the closing-cap D in its proper place until fastened. The cap D is a round piece of sheet metal or tin, with a tubular flange, shown in figs. 1, 4, 5 by letters $f\ f$, in section. The cap D, when put into the hole C, will rest with the edge of its tubular rim, $f$, on the conically-shaped part, $e$, of rim $b$, and, for reasons well known to mechanics, will settle in a central position to the hole C, leaving a very small annular space between the tubular rims $f$ and $e$, and at the same time making a nice fit at the edge of $f$, between $f$ and $e$, which prevents melted solder or other sealing-matter from finding a leak and dropping into the vessel.

In comparison with this I have shown, in fig. 6, a sectional view of the old system of shutting up vessels of the same description. Of this I am also the original inventor, but have allowed the public in general the benefit of its use. Here we find an annular groove forming the limit of hole C', and which presents the shape of a double-inclined rim, $b'\ c'$. The cap D, with its downward inclined rim, $f$, should fit closely on rim $c'$, which, in practice, it seldom does, because the machinery necessary to effect a perfect fit would be far too expensive for profitable business. The consequence of such imperfect fit is this, that the melted solder, which is indicated with red section lines, after filling the groove between $f'$ and $b'$, will rise between $f'$ and $e'$, and run over the edge of rim $e'$, which is generally lower than the level part of B', and drop into the vessel.

A comparison between figs. 4 and 5 with fig. 6, in which the red section lines represent the solder or sealing-matter, shows clearly the great difference of the amount of material necessary to shut vessels according to the old or new method that I want to claim. But, besides the great saving of material, I am also enabled to save a great amount of valuable time and labor. It is evident that a small piece of solder can be melted quicker and operated easier than a large piece. A tinner can now solder nearly twice as many tin cans as he could before. But the groove in the old can or vessel generally gets filled while the can is getting filled, which makes soldering impossible. It is, therefore, necessary to employ an extra set of hands for the sole purpose of wiping and cleaning these grooves. This is altogether avoided in my new construction, as the drawings plainly show.

To prevent the melting solder from running and spreading over the cap D, before the mechanic has time to draw it around with his soldering-tool, I either round off the corner, $c$, in hole C, fig. 4, or the corner, $c$, on cap D, fig. 5, thus effecting a very small groove, which the melted solder will follow with great ease, while filling the space between $f$ and $b$.

Another advantage gained by the formation of the hole C, as shown in figs. 1, 4, 5, is this In transporting raw oysters, we often send the vessels shut up with a stopper or a cork. It is evident that for forcing a cork in a hole and retaining it there, there could not be a more proper shape chosen than that shown in figs. 1, 4, 5, nor a worse one than shown in fig. 6.

I do not claim my old invention, shown in figs. 3 and 6.

I claim—

1. The combination of a hole, C, and cap D, shown in figs. 1, 4, 5, constructed and operated in the manner and for the purpose herein substantially set forth.

2. Forming or shaping a hole, C, as shown in figs. 1, 4, 5, in the manner and for the purpose herein set forth.

PETER NUMSEN.

Witnesses:
 Jos. I. Peyton,
 Baltis De Long.